L. H. STEARNS.
PASSENGER STILE FOR RAILWAYS.
APPLICATION FILED AUG. 7, 1914.
1,216,179.
Patented Feb. 13, 1917.
4 SHEETS—SHEET 3.
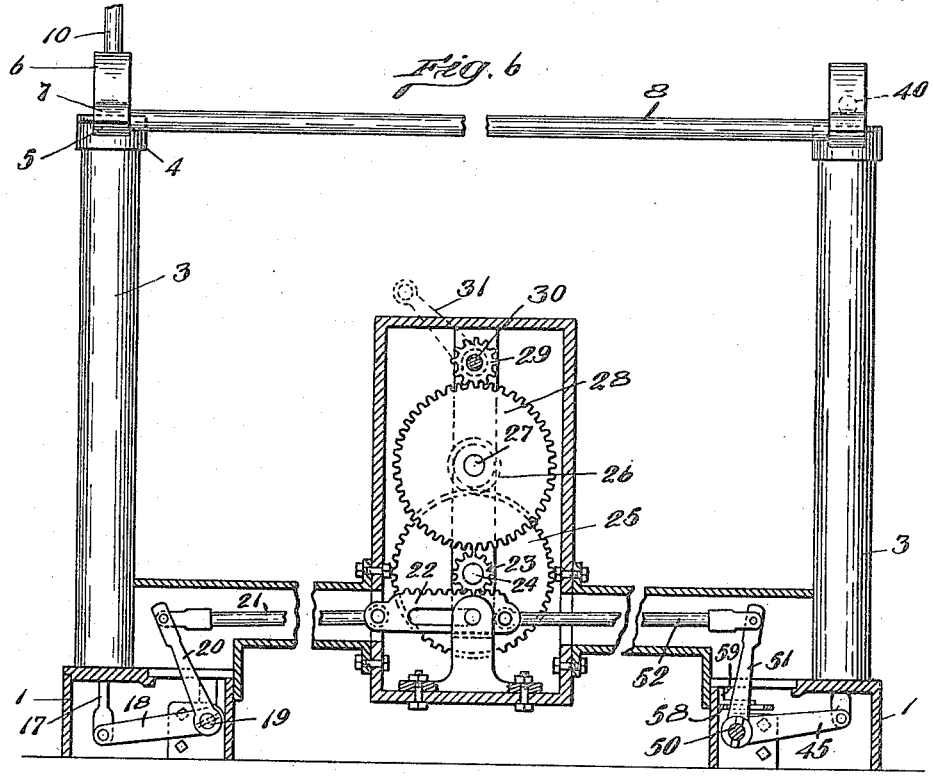
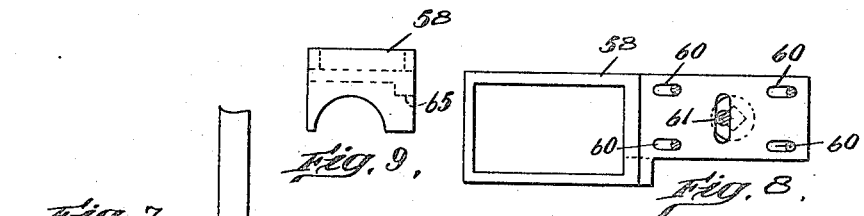
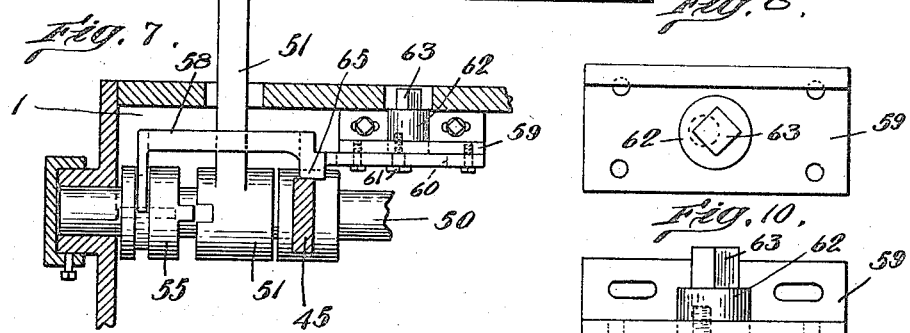
Witnesses:
H. B. Davis
R. Connell
Inventor:
Lowell H. Stearns

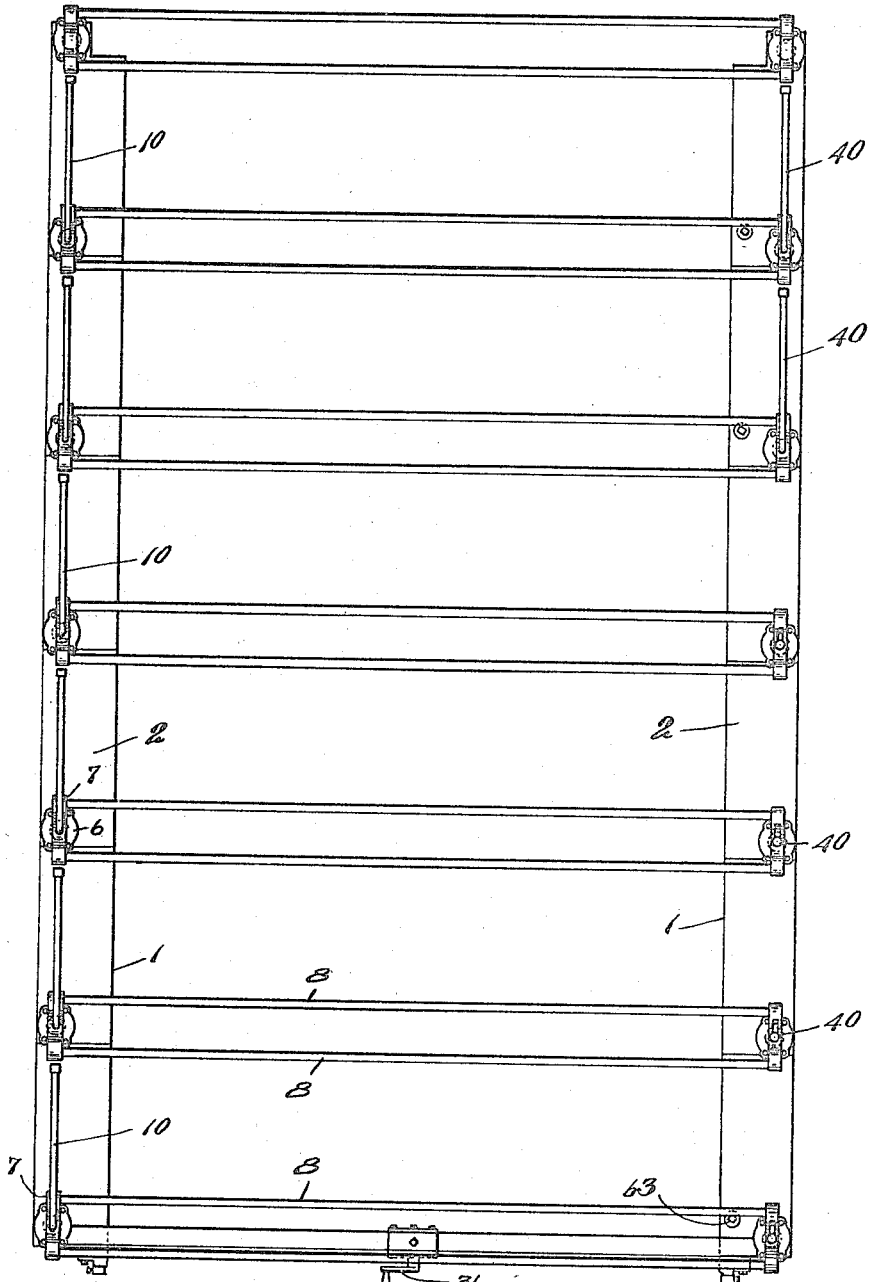

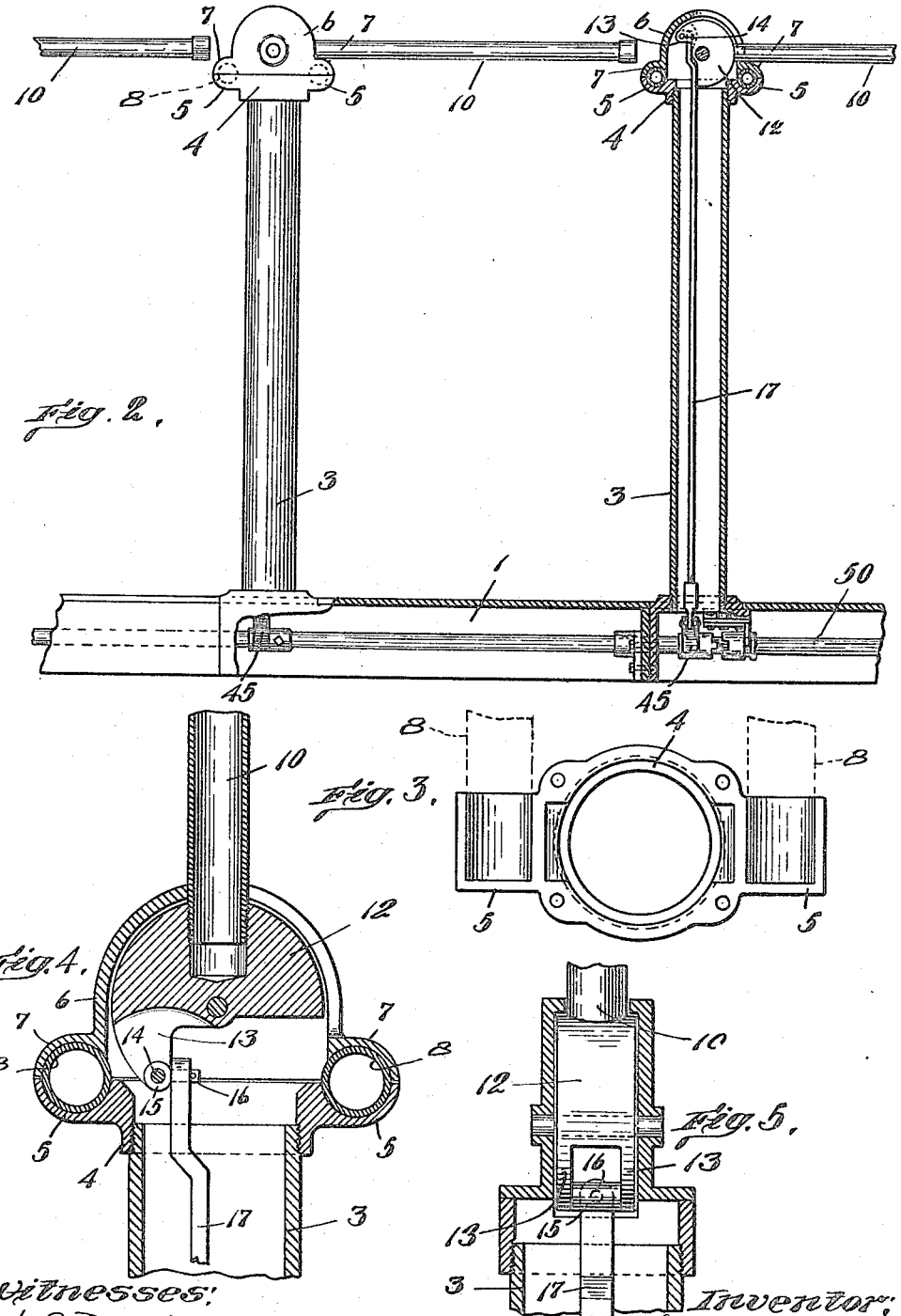

L. H. STEARNS.
PASSENGER STILE FOR RAILWAYS.
APPLICATION FILED AUG. 7, 1914.

1,216,179.

Patented Feb. 13, 1917.
4 SHEETS—SHEET 4.

Witnesses:
H. B. Davis
R. Connell

Inventor:
Lowell H. Stearns
by Rogers & Hanninan
Attys

UNITED STATES PATENT OFFICE.

LOWELL H. STEARNS, OF FITCHBURG, MASSACHUSETTS.

PASSENGER-STILE FOR RAILWAYS.

1,216,179.  Specification of Letters Patent.  Patented Feb. 13, 1917.

Application filed August 7, 1914. Serial No. 855,694.

*To all whom it may concern:*

Be it known that I, LOWELL H. STEARNS, a citizen of the United States, residing at Fitchburg, in the county of Worcester and State of Massachusetts, have invented an Improvement in Passenger-Stiles for Railways, of which the following is a specification.

At the present time much difficulty is experienced in passengers entering and leaving electric cars, particularly at terminals, and also at certain stopping-places during rush hours, the passengers leaving the car struggling for a passageway, and the passengers entering the car struggling for the seats, and many accidents of greater or lesser magnitude happen during such times which the employees of the railway company are powerless to prevent.

This invention has for its object the provision of a suitable stile whereby an unobstructed passage-way is provided for the passengers leaving the car, and also unobstructed passage-ways are provided for the passengers entering the car. Usually these cars have seats arranged transversely with an entrance at each end, being at each side of the car, and it is with these cars in particular that my stile is designed for coöperation.

In general my stile comprises a plurality of upright frame-sections, arranged in parallel relation, with spaces between them which spaces form passage-ways, and which in number correspond with the number of transversely arranged seats in a car, and each passage-way is made long enough to provide standing-room for a number of passengers corresponding with the number of passengers which may be seated on each seat of the car, usually five. At the exit and preferably also at the entrance to each passage-way of the stile a suitable gate is arranged. Operating-means are provided for the gates; and preferably all of the gates at the exits of the passage-ways are arranged for simultaneous operation by said operating-means; and also all of the gates at the entrances to the passage-ways are or may be arranged for connection with said operating-means by suitable clutches, whereby they may or may not be operated simultaneously with the gates at the exits of the passage-ways, and in case the same operating-means is employed for operating the gates at both ends of the passage-ways, the connections of the gates with the operating-means is or may be such that movement of the gates at the opposite ends of the passage-ways will be in the opposite direction, so that upon closing the gates at one end of the passage-ways the gates at the other end thereof will be opened, and vice versa.

Furthermore, separate clutch-means are or may be provided for the gates at the entrances to some of the passage-ways for connecting them with the operating-means, whereby they may remain in open or closed position, as desired, during the operation of the other gates.

Furthermore, locking-means are or may be provided for some of the gates, whereby they may be held in a certain position, and, as here shown, said locking-means is associated with the clutch-operating-mechanism, so that a single locking-means may be utilized to lock all these gates which are arranged for connection with the operating-means by the clutch which is operated by said clutch-operating-mechanism.

Figure 1 is a plan view of a stile embodying this invention.

Fig. 2 is an enlarged side-elevation and vertical-section of a portion of the stile.

Fig. 3 is an enlarged plan view of the supporting-ring for the hand-rails at the sides of the passage-ways.

Figs. 4 and 5 are enlarged detail views of the oscillating-head which is arranged in a housing on top of each upright post of the stile-sections, which head supports a gate.

Fig. 6 is an end-elevation of the stile, the housing inclosing the operating-means for the gates being represented in vertical section to expose said operating-means.

Figs. 7, 8, 9, 10, and 11 are enlarged details of the clutch and clutch operating-means.

Figure 12:
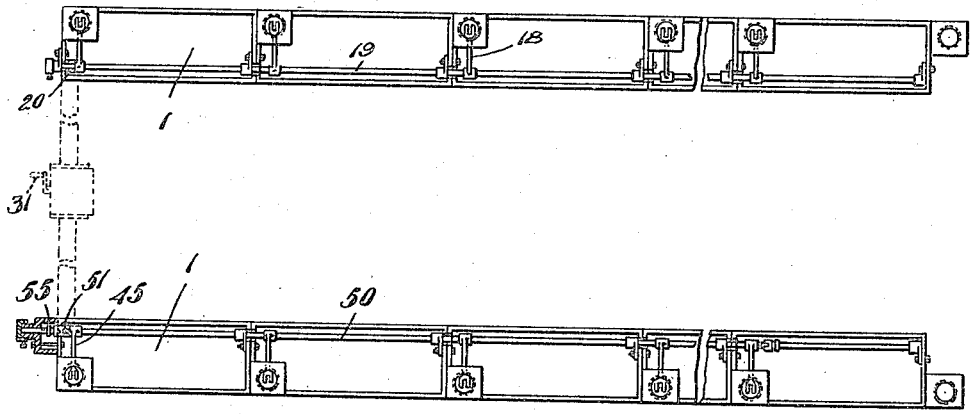

Fig. 12 is a plan-view of the operating-means for the gates of the stile.

Figure 14:
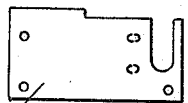
Figure 13:
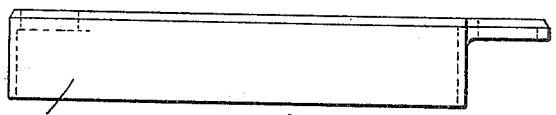

Figs. 13 and 14, respectively are side and end elevations of one of the housings through which the gate operating-means extends.

Figure 15:
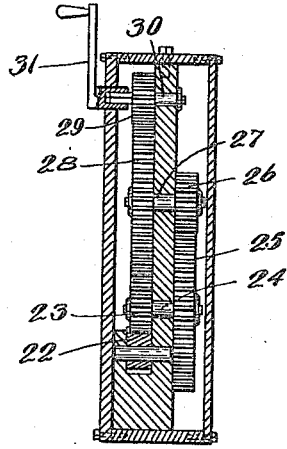

Fig. 15 is a side-elevation of the gearing of the operating-means for the gates.

Figure 16:
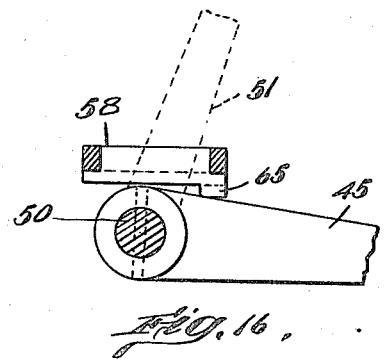

Fig. 16 is an enlarged sectional detail of the clutch operating-member associated with one of the arms on one of the oscillating shafts.

1, 1 represents a pair of hollow boxes or housings which serve as base-blocks for one of the sections. These blocks are designed to be placed in a suitable flooring of concrete or other material and to be arranged suitable distances apart; they are fitted with covers 2, and at one of the top corners of each block an upright hollow post 3 is erected, and each post 3 has a ring 4 or other form of support at the top, which ring has a pair of laterally extended ears 5, 5, formed with recesses, and a bonnet 6 is arranged on said ring, likewise having laterally extended ears 7, formed with recesses, which ears rest on the ears 5, 5, of the ring 4, with the recesses in each arranged to register with each other, thereby forming sockets. Said ring and bonnet forms a housing which is surmounted on the upper end of each upright post. Between said pair of upright posts 3, 3, a pair of horizontal bars 8, 8, are arranged, and the end-portions of said bars enter the sockets in the head 6, which is arranged on said posts. A frame-structure is thus produced which is herein termed an upright-section. The stile involves a plurality of these upright-sections, which are arranged in parallel relation, with spaces between them which serve as passage-ways, said passage-ways being of a width and length sufficient to afford standing-room for several passengers. It is the intention to have these passage-ways long enough to afford standing-room for a number of passengers corresponding to the number of passengers which may conveniently sit on each seat of the car, and as, at the present time, these seats are made to accommodate five people, hence the passage-ways will be made of a length to afford standing-room for five people. The upright posts are made long enough to support the horizontal bars at a suitable elevation whereby they are within easy reach of the people standing between them, so that said bars may serve as hand-rails, and it will be noted that as a pair of bars are provided for each section, each passage-way will be provided with a pair of separate hand-rails. A plurality of upright-sections are designed to be located at a terminal or stopping place of a car, and at a suitable distance removed from the car to afford a passage-way extending lengthwise of the car between the car and the adjacent ends of the sections, thereby providing a passage-way for the people leaving the car. It is furthermore designed to have the car stop with its seats opposite the passage-ways provided by the upright-sections so that the people standing in said passage-ways may pass directly to and enter the car.

Each passage-way has a gate at each end and means are provided for moving said gate into closed and open position. As here shown, 10 represents the gate at the exit of the passage-way. It is made as a short section of pipe or bar, see Figs. 2 to 5, one end of which extends through a slot in the housing 6 at the top of a post and is secured to a block 12, which is pivotally arranged in said housing, and movement of said block on its pivot is sufficient to move the gate or bar 10 from a vertical or open position to a horizontal or closed position. Said block 12 has an ear 13, with a pin 14 thereon, which pin receives loosely upon it an eye 15 on a short arm 16, which receives upon it the upper end of a link 17. Said link 17 is arranged in vertical position within the post and extends down through the post into the box 1, and its lower end is loosely connected to a crank-arm 18, secured to an oscillatory shaft 19 at that side of the stile adjacent to car, each passage-way has a gate 10, and means connected with said gate, substantially as aforesaid, which extends down through the upright posts to the crank-arms 18, and all of said crank-arms 18, are secured to the oscillatory shaft 19, which shaft is made continuous and extends through all of the boxes. Upon a turning movement of the said shaft 19, all of said crank-arms 18, will be moved, and all of said gates 10 will be correspondingly moved to open and close the passage-ways. A crank-arm 20 is secured to said shaft 19, prefreably at one end thereof, which is connected by a link 21 to a rack-bar 22, contained in a suitable housing, and which is suitably supported, and said rack-bar is arranged in horizontal position and is engaged by a pinion 23, secured to a shaft 24, bearing a toothed gear-wheel 25, which engages a pinion 26, secured to a shaft 27, bearing a toothed gear-wheel 28, which is engaged by a pinion 29, secured to a shaft 30, to which a crank-arm 31 or other means is or may be connected. By this form of gearing the rack-bar will be moved, thereby to move all of the gates 10. This gearing and rack-bar and connections with the shaft 19, serve as and constitute a means for operating said shaft, by which said shaft is turned in either direction at will, thereby to open or close the gates 10.

At the opposite ends of the passage-ways, which form the entrances thereto, similar gates 40 are provided, which are made as bars and extend through slots in the housings 4, 6, on the upright posts. The gates T are secured to blocks as 12, pivotally arranged in said housings, which blocks are loosely connected by links as 17, with arms 45 secured to a shaft 50, all substantially the same as the corresponding parts or elements heretofore described. In view of the fact that it is sometimes desirable to leave these gates 40 in open or closed positions, and sometimes desirable to move them simultaneously with the gates 10, the same operating-means may be employed for moving them, but clutch means is provided for connecting the operating-means with the shaft 50, in lieu of having a rigid connection, as heretofore described. As here shown, 51 represents an arm which is loosely mounted on the shaft 50, which arm is connected by a link 52, with the aforesaid rack-bar 22, to be moved by and with said rack-bar, and the hub of said arm is formed with a clutch-engaging face, and a clutch-member 55, is slidably arranged on the shaft 50, having a clutch-engaging face for engagement with the clutch-engaging face of the hub 51, and said sliding clutch-member 55, is splined to the shaft, thereby turning with it, and when an engagement with said member 51 connects said member 51 with the shaft, so that the shaft is oscillated by and with said member. As a means for moving said sliding clutch-member 55, along on the shaft into and out of engagement with the member 51, a sliding member, here shown as a plate 58 is employed, see Figs. 8 to 11, said member having a yoke-formed end-portion for engagement with the sliding-member 55, and its other end-portion extends along beneath a plate 59, which is secured to the housing, and said plate 58 is movable longitudinally to correspondingly move the sliding clutch-member, its end-portion having slots 60, permitting such movement of the plate. As a means for moving said plate longitudinally, a pin 61 may be arranged in a transverse slot of the plate, which projects downwardly from a rotatable-member 62, said member having a square end-portion 63, adapted to receive a crank or other tool by which to rotate it and thereby move its pin 61 in the arc of a circle in the transverse slot, and to move the plate longitudinally. Said plate 58 is arranged to extend over the adjacent arm 45 which is connected with the shaft 50, which arm is connected by a link with the oscillating-member bearing the gates, and said plate has a projection 65, arranged for engagement with said arm, when the plate is in a certain position, as for instance, when the clutch-member is disconnected from the member 51, thereby to hold said arm in its lowermost position with the gates in upright position, and, as several of the other gates at the entrances to the passage-ways are similarly connected with said shaft 50, they will also be held in upright position, but when said clutch operating-plate is moved to cause the clutch-member to engage the member 51 for the purpose of causing oscillation of the shaft 50, said projection 65 will have been moved out of engagement with said member, thereby permitting oscillation of the shaft.

The stile is made as long as the longest car which is used by the railway company, but in many instances the company uses some short cars, and hence it is desirable to arrange for leaving the gates at the entrances to certain passage-ways in closed position. To accomplish this result a separate clutch-mechanism is or may be provided for some of the gates, whereby to connect their arms 45, with the oscillatory shaft 50, clutch-mechanism constructed the same as the clutch-mechanism shown in Figs. 8 to 11, may be employed for this purpose, which it is not deemed necessary to further describe.

I claim:

1. The stile herein described consisting of a plurality of upright-sections arranged in parallel relation with spaces between them forming passage-ways, bars arranged to extend across said passage-ways, oscillating heads to which said bars are connected, an oscillating shaft, means connecting said heads with said shaft, and means to oscillate said shaft.

2. The stile herein described consisting of a plurality of upright-sections arranged in parallel relation with spaces between them forming passage-ways, bars arranged to extend across said passage-ways, oscillating heads to which said bars are connected, an oscillating shaft, means to connect the heads with and disconnect them from said shaft and means to oscillate said shaft.

3. The stile herein described consisting of a plurality of upright-sections arranged in parallel relation with spaces between them forming passage-ways, gates connected with said sections at each end thereof, arranged for opening and closing the ends of the passage-ways and operating-means for said gates, the operating means to which all of the gates at one end of the passage-ways are connected being arranged for simultaneous operation, and a clutch-means for connecting the gates at the other ends of the passage-ways with said operating-means.

4. The stile herein described consisting of a plurality of upright-sections arranged in parallel relation with spaces between them forming passage-ways, gates connected with said sections at each end thereof, arranged for opening and closing the ends of the passage-ways, operating-means for said gates, and means arranged to move simultaneously the gates at one end of each passage-way in one direction, and the gates at the other ends of the passage-ways in the opposite direction.

5. The stile herein described consisting of a plurality of upright-sections arranged in parallel relation with spaces between them forming passage-ways, gates connected with said sections at each end thereof, arranged for opening and closing the ends of the passage-ways, operating-means for said gates, and means to disconnect some of the gates from their operating-means.

6. The stile herein described consisting of a plurality of upright-sections arranged in parallel relation with spaces between them forming passage-ways, gates connected with said sections at each end thereof, arranged for opening and closing the ends of the passage-ways, oscillating shafts arranged coextensive with the sections, at each end thereof, means to connect the gates with said shafts, and means arranged to operate said shafts to move the gates.

7. The stile herein described consisting of a plurality of upright-sections arranged in parallel relation with spaces between them forming passage-ways, gates connected with said sections at each end thereof, arranged for opening and closing the ends of the passage-ways, oscillating shafts arranged coextensive with the sections, at each end thereof, means to connect the gates with said shafts, and means to oscillate said shafts in opposite directions, thereby to move the gates at one end of the passage-ways in one direction and the gates at the other ends of the passage-ways in the opposite direction.

8. The stile herein described consisting of a plurality of upright-sections arranged in parallel relation with spaces between them forming passage-ways, gates connected with said sections at each end thereof, arranged for opening and closing the ends of the passage-ways oscillating shafts arranged coextensive with the sections, at each end thereof, means connecting the gates at one end of the passage-ways with one of the shafts, clutching-means arranged to connect the gates at the other ends of the passage-ways with the other shaft and operating-means for said shafts.

9. The stile herein described consisting of a plurality of upright-sections arranged in parallel relation with spaces between them forming passage-ways, gates connected with said sections at each end thereof, arranged for opening and closing the ends of the passage-ways, oscillating shafts arranged coextensive with the sections at each end thereof, operating-means for said shafts, means to connect the gates with the shafts, means connecting one of the shafts with the operating-means arranged to connect the other shaft with said operating-means.

10. The herein described stile comprising a series of horizontally spaced uprights, spaced parallel bars carried by each upright, the adjacent bars of adjacent uprights forming one stile-way, and gates carried by the uprights and bridging the space between such adjacent bars.

In testimony whereof, I have signed my name to this specification, in the presence of two subscribing witnesses.

LOWELL H. STEARNS.

Witnesses:
JOHN B. FELLOWS,
RALPH H. FALES.

Copies of this patent may be obtained for five cents each, by addressing the "Commissioner of Patents, Washington, D. C."